(12) United States Patent
Ren et al.

(10) Patent No.: US 12,353,323 B1
(45) Date of Patent: Jul. 8, 2025

(54) RESOURCE OBJECT PROCESSING METHOD, DEVICE, AND STORAGE MEDIUM

(71) Applicant: Beijing Volcano Engine Technology Co., Ltd., Beijing (CN)

(72) Inventors: Jingsi Ren, Beijing (CN); Bo Wang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/965,828

(22) Filed: Dec. 2, 2024

(30) Foreign Application Priority Data

Mar. 29, 2024 (CN) .......................... 202410383684.1

(51) Int. Cl.
*G06F 12/00* (2006.01)
*G06F 12/02* (2006.01)

(52) U.S. Cl.
CPC .................................. *G06F 12/023* (2013.01)

(58) Field of Classification Search
CPC ...... G06F 12/023; G06F 9/5083; G06F 9/505; G06F 9/4856; G06F 2009/4557; H04L 41/08; H04L 43/08
See application file for complete search history.

(56) References Cited

U.S. PATENT DOCUMENTS

| | | | |
|---|---|---|---|
| 2009/0259736 A1* | 10/2009 | Chang | H04L 67/1031 709/221 |
| 2013/0198250 A1 | 8/2013 | Iwamatsu et al. | |
| 2022/0329486 A1* | 10/2022 | Nagaprakash | H04L 43/0811 |

FOREIGN PATENT DOCUMENTS

| | | |
|---|---|---|
| CN | 115328752 A | 11/2022 |
| EP | 3843334 B1 | 3/2023 |

OTHER PUBLICATIONS

European Patent Application No. 24216720.3; Partial Search Report; dated Mar. 31, 2025; 17 pages.

\* cited by examiner

*Primary Examiner* — Shawn X Gu
(74) *Attorney, Agent, or Firm* — BakerHostetler

(57) ABSTRACT

The present disclosure provides a resource object processing method, a device, and a storage medium. The method includes: obtaining a control unit identifier set and a service address set of a federated storage cluster control layer, the control unit identifier set being used to maintain respective unit identifiers of multiple control units independent and isolated, and supported in the federated storage cluster control layer; mapping a unit identifier of a target control unit uniquely corresponding to the target object from the control unit identifier set according to a first object identifier of a target object to be processed; and determining a target service address corresponding to the target control unit from the service address set according to the unit identifier of the target control unit, establishing a communication connection based on the target service address, and performing a resource processing operation of the target object through the communication connection.

20 Claims, 6 Drawing Sheets

RESOURCE OBJECT PROCESSING METHOD, DEVICE, AND STORAGE MEDIUM

CROSS-REFERENCE TO RELATED APPLICATION(S)

The application claims priority to the Chinese patent application No. 202410383684.1, filed on Mar. 29, 2024, the entire disclosure of which is incorporated herein by reference as part of the present application.

TECHNICAL FIELD

Embodiments of the present disclosure relate to the field of cloud computing technology, and in particular, to a resource object processing method and apparatus, a device, and a storage medium.

BACKGROUND

With the development of cloud computing technology, there are more and more resource objects corresponding to cloud computing. At present, multiple storage clusters can be used to store resource objects, so as to improve the storage capacity of a storage system.

In the prior art, the storage system includes a federated storage cluster control layer and multiple storage clusters. The federated storage cluster control layer is network-connected to the multiple storage clusters. The federated storage cluster control layer may receive a processing request (for example, a storage request) of a resource object, and store the resource object into the storage cluster.

However, the inventors of the present disclosure found that the prior art has at least the following technical problems: when the federated storage cluster control layer is faulty, the processing of all resource objects is affected, which results in poor stability of the storage system.

SUMMARY

Embodiments of the present disclosure provide a resource object processing method and apparatus, a device, and a storage medium, which can improve the stability of a storage system.

In a first aspect, an embodiment of the present disclosure provides a resource object processing method. The method includes:
  obtaining a control unit identifier set and a service address set of a federated storage cluster control layer, wherein the control unit identifier set is used to maintain respective unit identifiers of multiple control units that are independent and isolated from each other and are supported in the federated storage cluster control layer, and one control unit of the multiple control units is used to control resource processing of at least one storage cluster in a federated storage cluster; the service address set is used to maintain a service address of each control unit of the multiple control units in the storage cluster control layer;
  mapping, according to a first object identifier of a target object to be processed, a unit identifier of a target control unit uniquely corresponding to the target object from the control unit identifier set; and
  determining, according to the unit identifier of the target control unit, a target service address corresponding to the target control unit from the service address set, establishing a communication connection based on the target service address, and performing a resource processing operation of the target object through the communication connection.

In a second aspect, an embodiment of the present disclosure provides a resource object processing apparatus. The apparatus includes:
  an obtaining module configured to obtain a control unit identifier set and a service address set of a federated storage cluster control layer, the control unit identifier set is used to maintain respective unit identifiers of multiple control units that are independent and isolated from each other and are supported in the federated storage cluster control layer, and one control unit of the multiple control units is used to control resource processing of at least one storage cluster in a federated storage cluster; the service address set is used to maintain a service address of each control unit of the multiple control units in the storage cluster control layer;
  a mapping module configured to map, according to a first object identifier of a target object to be processed, a unit identifier of a target control unit uniquely corresponding to the target object from the control unit identifier set; and
  a processing module configured to determine, according to the unit identifier of the target control unit, a target service address corresponding to the target control unit from the service address set, establish a communication connection based on the target service address, and perform a resource processing operation of the target object through the communication connection.

In a third aspect, an embodiment of the present disclosure provides an electronic device including:
  a processor, and a memory communicatively connected to the processor;
  the memory stores computer execution instructions; and
  the processor executes the computer execution instructions stored in the memory to implement the resource object processing method according to the above first aspect.

In a fourth aspect, an embodiment of the present disclosure provides a computer-readable storage medium. The computer-readable storage medium stores computer execution instructions, and upon a processor executing the computer execution instructions, the resource object processing method according to the above first aspect is implemented.

In a fifth aspect, an embodiment of the present disclosure provides a computer program product, including a computer program. Upon the computer program being executed by a processor, the resource object processing method according to the above first aspect is implemented.

The embodiments provide a resource object processing method and apparatus, a device, and a storage medium. The method includes: obtaining a control unit identifier set and a service address set of a federated storage cluster control layer, wherein the control unit identifier set is used to maintain respective unit identifiers of multiple control units that are independent and isolated from each other and are supported in the federated storage cluster control layer, and one control unit of the multiple control units is used to control resource processing of at least one storage cluster in a federated storage cluster; the service address set is used to maintain a service address of each control unit of the multiple control units in the storage cluster control layer; mapping, according to a first object identifier of a target object to be processed, a unit identifier of a target control unit uniquely corresponding to the target object from the control unit identifier set; and determining, according to the unit identifier of the target control unit, a target service address corresponding to the target control unit from the service address set, establishing a communication connection based on the target service address, and performing a resource processing operation of the target object through the communication connection. In the embodiments of the present disclosure, because a single federated storage cluster control layer is split into multiple control units that are independent and isolated from each other, and the resource processing of at least one storage cluster is controlled through the control units that are independent and isolated from each other. In this way, even if a certain control unit is faulty, the processing of a resource request by another control unit will not be affected, thereby improving the stability of the storage system.

BRIEF DESCRIPTION OF DRAWINGS

In order to more clearly illustrate the technical solutions in the embodiments of the present disclosure or in the prior art, the following will briefly introduce the drawings that need to be used in the description of the embodiments or the prior art. Obviously, the drawings in the following description are some embodiments of the present disclosure, and those skilled in the art can also obtain other drawings according to these drawings without paying creative work.

DETAILED DESCRIPTION

Figure 1:
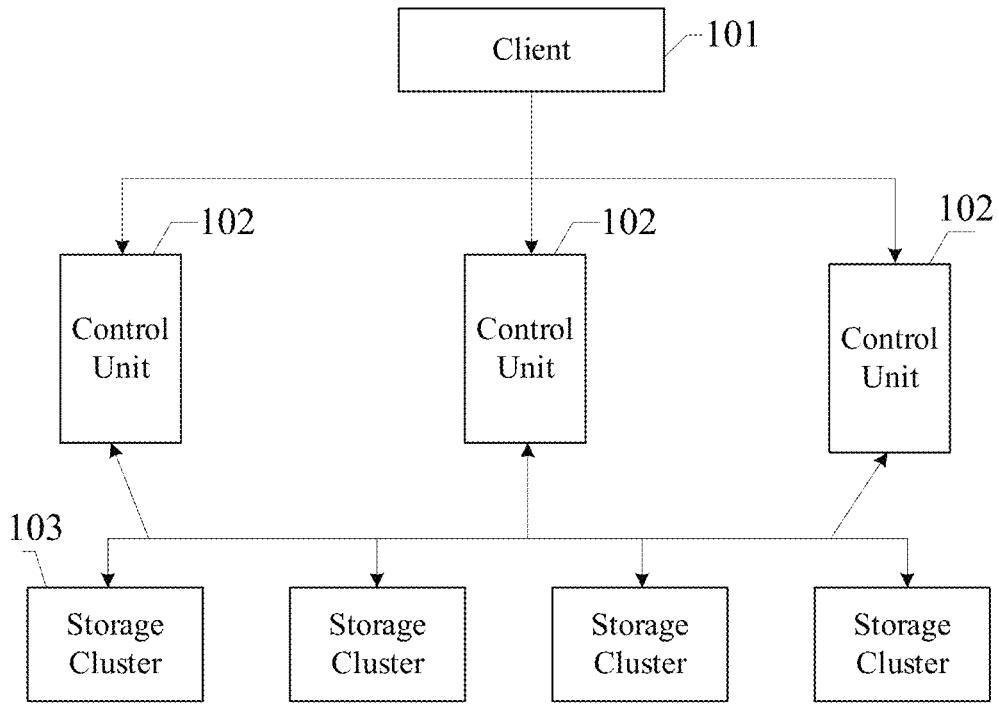
FIG. 1 is a schematic diagram of an application scenario of a resource object processing method provided by an embodiment of the present disclosure.

In order to make the objects, technical solutions, and advantages of the embodiments of the present disclosure clearer, the technical solutions in the embodiments of the present disclosure will be clearly and completely described below with reference to the drawings in the embodiments of the present disclosure. Obviously, the described embodiments are part of the embodiments of the present disclosure, but not all of them. Based on the embodiments in the present disclosure, all other embodiments obtained by those of ordinary skill in the art without creative work fall within the protection scope of the present disclosure.

It should be noted that the user information (including but not limited to user device information, user personal information, etc.) and data (including but not limited to analyzed data, stored data, data for display, etc.) involved in this application are information and data authorized by the user or fully authorized by all parties, and the collection, use, and processing of related data need to comply with relevant laws, regulations, and standards, and corresponding operation entries are provided for users to choose to authorize or refuse.

With the development of cloud computing technology, there are more and more resource objects corresponding to cloud computing. At present, multiple storage clusters can be used to store resource objects, so as to improve the storage capacity of a storage system.

In the prior art, the storage system includes a federated storage cluster control layer and multiple storage clusters. The federated storage cluster control layer is network-connected to the multiple storage clusters. The federated storage cluster control layer may receive a processing request (for example, a storage request) of a resource object, and store the resource object into the storage cluster. However, the federated storage cluster control layer in the prior art lacks an effective disaster recovery mechanism, when the federated storage cluster control layer is faulty, the processing of all resource objects is affected, which results in poor stability of the storage system.

It can be seen that how to provide a disaster recovery mechanism for the federated storage cluster control layer when the federated storage cluster control layer is faulty, thereby improving the stability of the storage system is a technical problem that needs to be solved urgently at present.

In order to solve the above problem, the present embodiment proposes the following technical concept: splitting a single federated storage cluster control layer into multiple control units that are independent and isolated from each other, so that even if a certain control unit is faulty, the processing of a resource request by another control unit will not be affected.

Specific implementation methods may include: first, obtaining a control unit identifier set and a service address set of a federated storage cluster control layer, in which the control unit identifier set is used to maintain respective unit identifiers of multiple control units that are independent and isolated from each other and are supported in the federated storage cluster control layer, and one control unit of the multiple control units is used to control resource processing of at least one storage cluster in a federated storage cluster; the service address set is used to maintain a service address of each control unit of the multiple control units in the storage cluster control layer; then, mapping, according to a first object identifier of a target object to be processed, a unit identifier of a target control unit uniquely corresponding to the target object from the control unit identifier set; finally, determining, according to the unit identifier of the target control unit, a target service address corresponding to the target control unit from the service address set, establishing a communication connection based on the target service address, and performing a resource processing operation of the target object through the communication connection.

In this case, because a single federated storage cluster control layer is split into multiple control units that are independent and isolated from each other, and the resource processing of at least one storage cluster is controlled through the control units that are independent and isolated from each other. In this way, even if a certain control unit is faulty, the processing of a resource request by another control unit will not be affected, thereby improving the stability of the storage system.

The following will explain the application scenarios of the embodiments of the present disclosure.

The resource object processing method provided by the embodiments of the present disclosure may be applied to application scenarios where various processing requests are processed through a storage system. FIG. 1 is a schematic diagram of an application scenario of a resource object processing method provided by an embodiment of the present disclosure. As shown in FIG. 1, the storage system includes a client 101, multiple storage clusters 103, and multiple control units that are independent and isolated from each other 102, and one control unit 102 is connected to at least one storage cluster 103 of the multiple storage clusters 103. When the client 101 receives a storage operation for a first resource object, the client 101 determines a target control unit for processing the first resource object from the multiple control units 102 that are independent and isolated from each other. The first resource object is stored into the storage cluster 103 through the target control unit. In this process, by allocating different resource objects to the multiple control units that are independent and isolated from each other, a single federated storage cluster control layer is split into multiple control units that are independent and isolated from each other, so that even if a certain control unit is faulty, the processing of a resource request by another control unit will not be affected.

The following uses detailed embodiments to explain in detail the resource object processing method provided by the embodiments of the present disclosure.

Figure 2:
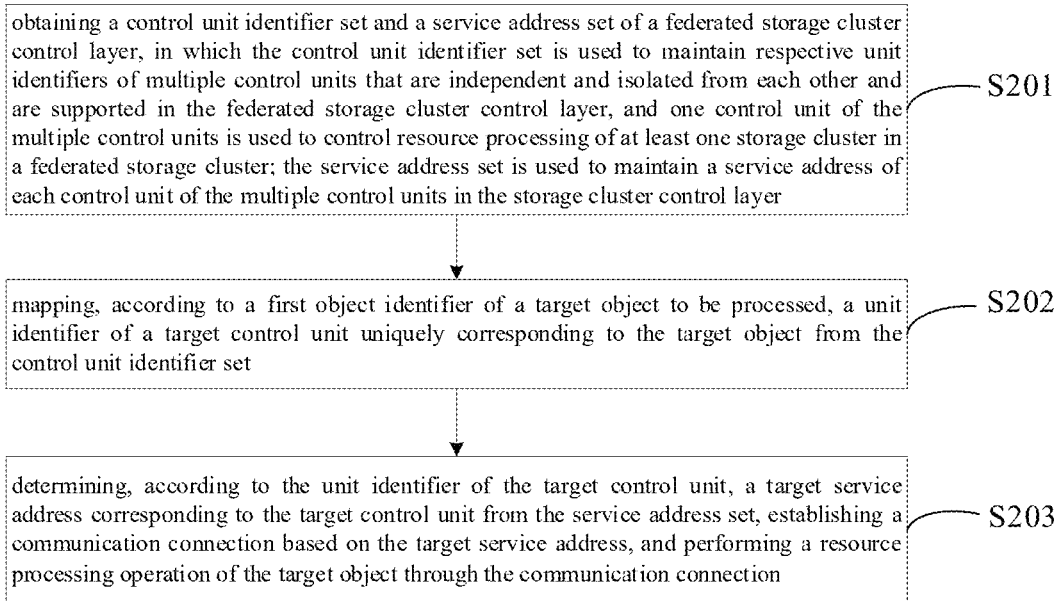
FIG. 2 is a flowchart of a resource object processing method provided by an embodiment of the present disclosure.

FIG. 2 is a flowchart of a resource object processing method provided by an embodiment of the present disclosure. Referring to FIG. 2, the method includes the following steps S201~S203.

S201: obtaining a control unit identifier set and a service address set of a federated storage cluster control layer, in which the control unit identifier set is used to maintain respective unit identifiers of multiple control units that are independent and isolated from each other and are supported in the federated storage cluster control layer, and one control unit of the multiple control units is used to control resource processing of at least one storage cluster in a federated storage cluster; the service address set is used to maintain a service address of each control unit of the multiple control units in the storage cluster control layer.

In the embodiment of the present disclosure, the federated storage cluster control layer includes multiple control units that are independent and isolated from each other, each control unit corresponds to one unit identifier, and each control unit corresponds to one service address. The multiple unit identifiers corresponding to the multiple control units that are independent and isolated from each other constitute a control unit identifier set, and multiple service addresses corresponding to the multiple control units that are independent and isolated from each other constitute a service address set. The service address corresponding to the control unit may be represented as "apiserver address".

It should be noted that the federated storage cluster includes multiple storage clusters, and one control unit is used to control resource processing of at least one storage cluster in the federated storage cluster. The resource object in each storage cluster has its own metadata which includes a namespace field, a name field, and a label field. The namespace field is used to represent a definition within a boundary of the namespace, and is an organization mechanism provided by the federated storage cluster, which is used to classify, filter, and manage a resource object group in the federated storage cluster.

Optionally, the storage system further includes a configuration server, and the configuration server stores a control unit identifier set and a service address set of the federated storage cluster control layer.

In some embodiments, a client or the federated storage cluster control layer may obtain the control unit identifier set and the service address set of the federated storage cluster control layer from the configuration server of the storage system, and then establish a communication connection between the control units and the client through a service address.

S202, mapping, according to a first object identifier of a target object to be processed, a unit identifier of a target control unit uniquely corresponding to the target object from the control unit identifier set.

In the embodiment of the present disclosure, the target object to be processed may be business data corresponding to a certain application. The object identifier of the resource object is used to distinguish different resource objects. Optionally, a first object identifier of the target object may include one or more selected from a group consisting of Chinese characters, English letters, and numbers. For example, the first object identifier of the target object may be service1, service2, etc. Optionally, when creating, accessing, updating, or deleting the resource object, it is necessary to obtain the object identifier of the resource object, and determine the target control unit for processing the resource object.

In some embodiments, the unit identifier of the target control unit uniquely corresponding to the target object may be mapped from the control unit identifier set through a hash algorithm model. Correspondingly, this step may include: determining an object identifier hash value of the first object identifier and a unit identifier hash value of each of the unit identifiers in the control unit identifier set according to the first object identifier, the control unit identifier set, and a hash algorithm model; mapping the unit identifier hash values of the unit identifiers to a hash ring according to an ascending order of the unit identifier hash values of the unit identifiers in the control unit identifier set; and finding a first target unit identifier hash value greater than the object identifier hash value in a clockwise direction of the hash ring, and determining a unit identifier corresponding to the first target unit identifier hash value as the unit identifier of the target control unit uniquely corresponding to the target object.

Optionally, the hash algorithm model may be a consistent hash function. The first object identifier may be a name of the target object.

Exemplarily, the consistent hash function may be represented as "ConsistentHash ( ). The first object identifier may be represented as "name". The unit identifier may be represented as CellID, and the unit identifier set composed of multiple unit identifiers may be represented as "CurrentCellIDs". Correspondingly, the unit identifier of the target control unit uniquely corresponding to the target object is mapped from the control unit identifier set through the following consistent hash function. The consistent hash function may be represented as:

TargetCellID=ConsistentHash (name, CurrentCellIDs), where TargetCellID represents the unit identifier of the target control unit.

S203, determining, according to the unit identifier of the target control unit, a target service address corresponding to the target control unit from the service address set, establishing a communication connection based on the target service address, and performing a resource processing operation of the target object through the communication connection.

In some embodiments, the service address set stores a correspondence between the service address and the unit identifier. The target service address corresponding to the target control unit is determined from the correspondence between the service address and the unit identifier, through the client or the federated storage cluster control layer, according to the unit identifier of the target control unit.

Figure 3:
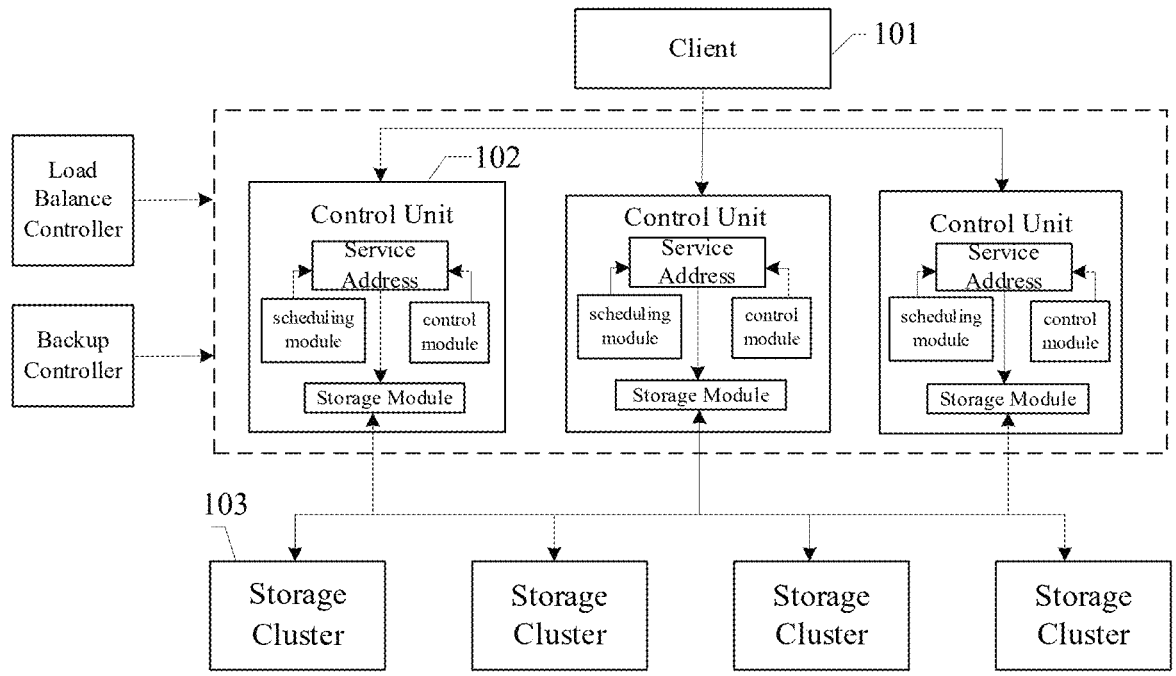
FIG. 3 is a schematic diagram of a resource object processing method provided by an embodiment of the present disclosure.

Optionally, as shown in FIG. 3, the control unit includes a scheduling module and a control module. Correspondingly, the step of establishing the communication connection based on the target service address, and performing the resource processing operation of the target object through the communication connection may include: establishing the communication connection between the target control unit and the client based on the target service address, and if the target control unit receives a processing request of the client through the communication connection, determining, through the scheduling module in the target control unit, a target storage cluster for processing the target object from at least one storage cluster connected thereto;
  if the processing request is a storage request, storing the target object on the target storage cluster through the control module in the target control unit;
  if the processing request is an access request, accessing the target object from the target storage cluster through the control module in the target control unit;
  if the processing request is an update request, updating the target object on the target storage cluster through the control module in the target control unit; and
  if the processing request is a deletion request, deleting the target object from the target storage cluster through the control module in the target control unit.

Optionally, the processing request may include one or more of a storage request, an access request, an update request, and a deletion request.

It should be noted that, as shown in FIG. 3, the control unit further includes a service address and a storage module, and the control unit may establish a communication connection with a client through the service address. Optionally, the control unit may cache the target object through the storage module, and then synchronize the target object in the storage module to the storage cluster through the control module.

The embodiments of the present disclosure provide a resource object processing method including: obtaining a control unit identifier set and a service address set of a federated storage cluster control layer, wherein the control unit identifier set is used to maintain respective unit identifiers of multiple control units that are independent and isolated from each other and are supported in the federated storage cluster control layer, and one control unit of the multiple control units is used to control resource processing of at least one storage cluster in a federated storage cluster; the service address set is used to maintain a service address of each control unit of the multiple control units in the storage cluster control layer; mapping, according to a first object identifier of a target object to be processed, a unit identifier of a target control unit uniquely corresponding to the target object from the control unit identifier set; and determining, according to the unit identifier of the target control unit, a target service address corresponding to the target control unit from the service address set, establishing a communication connection based on the target service address, and performing a resource processing operation of the target object through the communication connection. In the embodiments of the present disclosure, because a single federated storage cluster control layer is split into multiple control units that are independent and isolated from each other, and the resource processing of at least one storage cluster is controlled through the independent and isolated control units. In this way, even if a certain control unit is faulty, the processing of a resource request by another control unit will not be affected, thereby improving the stability of the storage system.

It should be noted that in the embodiments of the present disclosure, the storage system may further adjust the number of multiple control units according to a load pressure. When the number of resource objects increases and reaches the upper limit of the load capacity of the control unit, more control units need to be expanded to expand the capacity of the storage system. When the number of resource objects decreases and each control unit is under a relatively low load pressure, some units need to be removed to save system resources.

In some embodiments, as shown in FIG. 3, the storage system further includes a load adjustment server, and the load balance controller in the federated storage cluster performs the dynamic scale-up and scale-down processing on the control unit in the federated storage cluster control layer according to the actual load condition and the load balance requirement condition of the control units in the federated storage cluster control layer.

Figure 4:
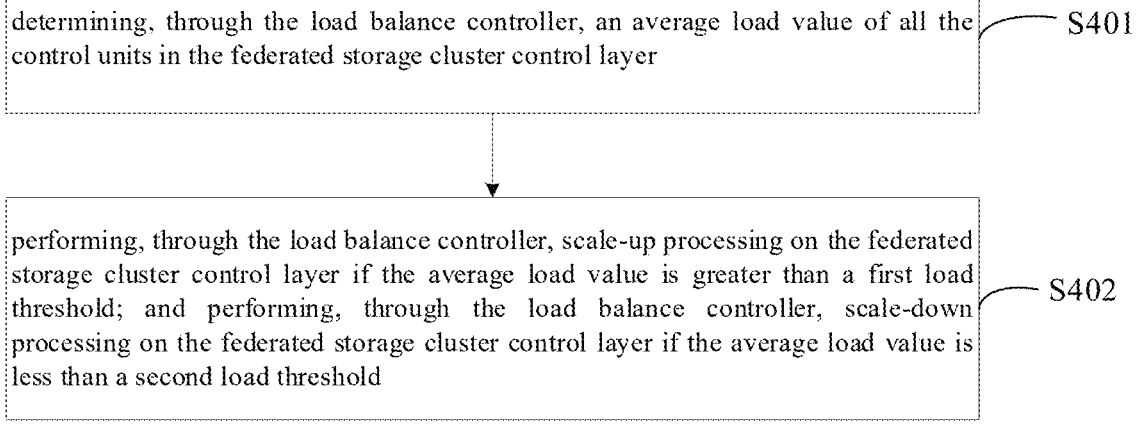
FIG. 4 is a flowchart of another resource object processing method provided by an embodiment of the present disclosure.

Correspondingly, as shown in FIG. 4, the method of performing the dynamic scale-up and scale-down processing on the control unit in the federated storage cluster control layer includes the following steps S401~ S402.

S401, determining, through the load balance controller, an average load value of all the control units in the federated storage cluster control layer.

In some embodiments, the first number of multiple control units in the federated storage cluster control layer and the second number of multiple second resource objects that have been stored may be determined through the load adjustment server, and the average load parameter of the multiple control units is determined according to the ratio of the second number to the first number.

S402, performing, through the load balance controller, scale-up processing on the federated storage cluster control layer if the average load value is greater than a first load threshold; and performing, through the load balance controller, scale-down processing on the federated storage cluster control layer if the average load value is less than a second load threshold.

In the embodiment of the present disclosure, the values of the first load threshold and the second load threshold are not specifically limited, and may be set and modified as required.

Figure 5:
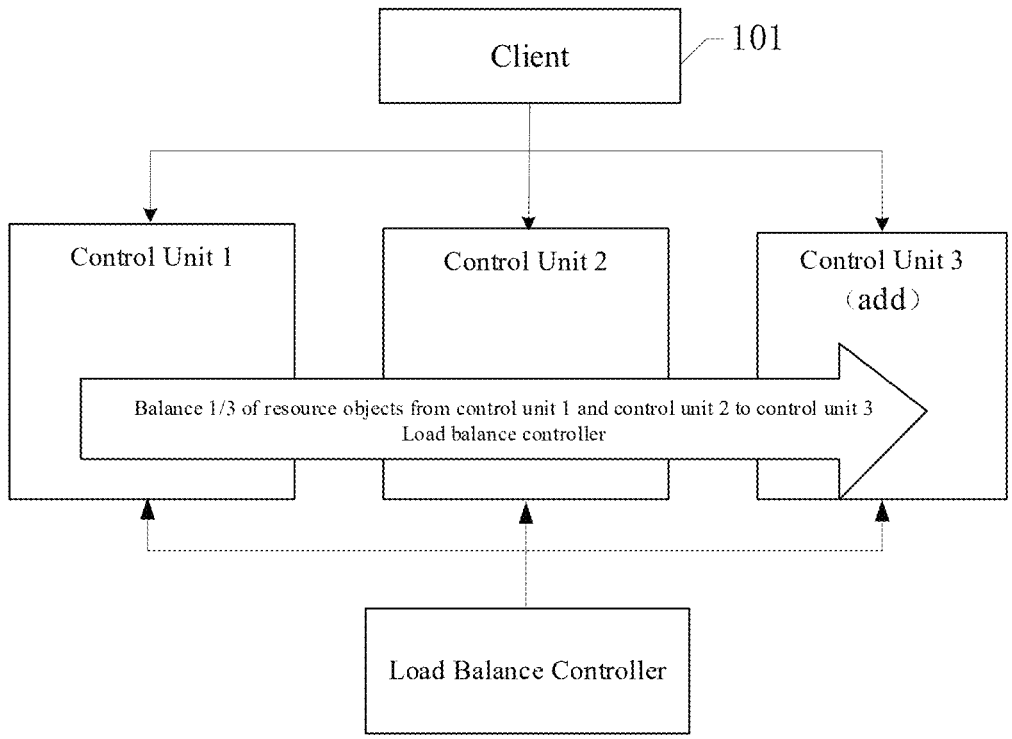
FIG. 5 is a schematic diagram of a resource object migration method provided by an embodiment of the present disclosure.

Exemplarily, as shown in FIG. 5, the multiple control units include a control unit 1 and a control unit 2, and it is determined that the average load parameter corresponding to the multiple control units is greater than the first preset threshold, and one control unit 3 is added through the load adjustment server, so that the average load parameter is less than the first preset threshold. At this time, the multiple control units include the control unit 1, the control unit 2, and the control unit 3, and ⅓ of the resources are balanced from the control unit 1 and the control unit 2 to the control unit 3 through the load balance controller.

It should be noted that after the number of multiple control units is adjusted, it is necessary to determine whether the control unit corresponding to each resource object has changed before and after the adjustment. If a change occurs, the resource object needs to be migrated, and if no change occurs, no migration is required. Correspondingly, the method further includes:

for each second resource object that has been stored, obtaining, through the load adjustment server, a second object identifier of the second resource object, a first control unit where the second resource object is currently located, and multiple unit identifiers of the multiple control units after adjustment of the number of the multiple control units; determining, through the load adjustment server, a second control unit for processing the second resource object according to the second object identifier of the second resource object, the multiple unit identifiers of the multiple control units after the adjustment of the number of the multiple control units, and a preset algorithm model; and if the first control unit is different from the second control unit, deleting the second resource object through the first control unit, and storing the second resource object through the second control unit. In some embodiments, after the second resource object is stored in the second control unit, the identification information of the control unit corresponding to the second resource object may be further changed to: the second control unit.

It should be noted that, in the load balance process of performing the scale-up and scale-down processing, an access request of the resource object may be normally processed.

Correspondingly, the specific method may include: in the load balance process of performing the scale-up and scale-down processing, receiving a first resource request for requesting to perform processing on a first resource, mapping a first target control unit corresponding to the first resource according to a first control unit identifier set before the scale-up and scale-down processing, and mapping a second target control unit corresponding to the first resource according to a second control unit identifier set after the scale-up and scale-down processing; and selecting, according to the first target control unit, the second target control unit, and a scale-up and scale-down classification condition of all the control units, the first target control unit or the second target control unit to control the execution of the first resource request, where the scale-up and scale-down classification condition of the control unit includes: a newly added control unit, a removed control unit, or a normal control unit.

Figure 6:
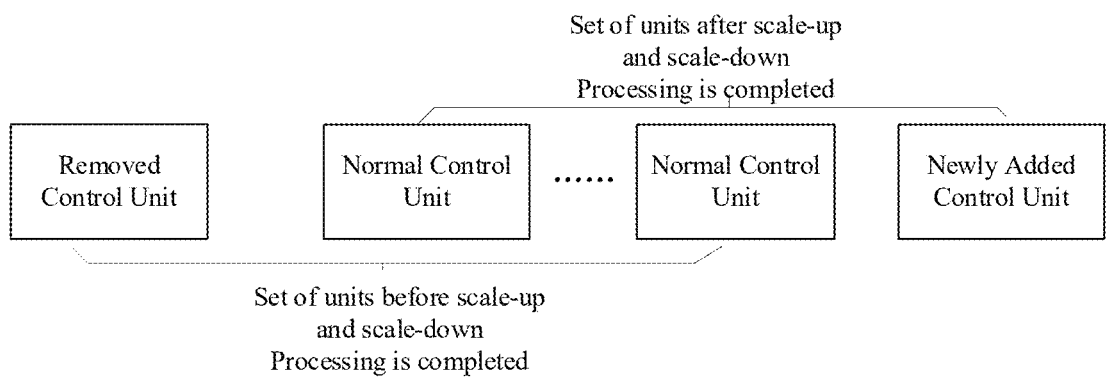
FIG. 6 is a schematic diagram of dynamic scale-up and scale-down processing provided by an embodiment of the present disclosure.

The normal control unit represents a unit that does not need to be moved. It should be noted that, as shown in FIG. 6, before the load balance of performing the scale-up and scale-down processing is completed, the multiple control units that are independent and isolated from each other include a removed control unit and a normal control unit. After the load balance of performing the scale-up and scale-down processing is completed, the multiple control units that are independent and isolated from each other include a newly added control unit and a normal control unit.

In some embodiments, whether to migrate the first resource may be determined according to the scale-up and scale-down classification condition of the first target control unit, the second target control unit, and all the control units.

Specifically, the following four cases are included: in the first case, if the first target control unit is the removed control unit and the second target control unit is the normal control unit, the first resource needs to be migrated. In the second case, if the first target control unit is the normal control unit and the second target control unit is the newly added control unit, the first resource needs to be migrated. In the third case, if the first target control unit is the normal control unit and the second target control unit is the newly added control unit, the first resource does not need to be migrated. In the fourth case, if the first target control unit is the normal control unit and the second target control unit is also the normal control unit, the first resource does not need to be migrated.

Further, for the above cases one, two, and three, the resource needs to be migrated. When the resource object needs to be migrated, whether to forward the request to the first target control unit (which may be represented as an OldCellID unit) or the second target control unit (which may be represented as a NewCellID unit) may be determined according to whether the migration operation is completed.

Optionally, the metadata of the first resource may be obtained from the first target control unit, the metadata is used to identify the control unit where the first resource is currently located or the migration state of the current control unit.

If the obtained metadata of the first resource includes the first target control unit, it means that the first resource has not yet started to be migrated. In this case, the first target control unit may be used to control the execution of the first resource request.

If the obtained metadata of the first resource includes "migrating", it means that the first resource is being migrated. In this case, the write operation on the first resource needs to be prohibited, the read request is normally forwarded, and the write request returns to retry.

If the metadata of the resource object cannot be obtained from the first target control unit, it means that the migrating of the first resource has been completed. In this case, the second target control unit may be used to control the execution of the first resource request.

In the embodiments of the present disclosure, the storage system may further adjust the number of multiple control units according to a load pressure. When the number of resource objects increases and reaches the upper limit of the load capacity of the control unit, more control units may be expanded to expand the capacity of the storage system. When the number of resource objects decreases and each control unit is under a relatively low load pressure, some units may be removed to save system resources, thereby improving the stability and flexibility of the storage system.

It should be noted that, in some embodiments, as shown in FIG. 3, the storage system further includes a backup controller, and the backup control unit of each resource object may be determined through the backup controller. For each resource object, the resource object is synchronized to the backup control unit of this resource object in real time through the backup controller. In this way, after the main control unit corresponding to the resource object (that is, the target control unit determined in the step S202) is faulty, the configuration may be modified to map and switch the resource object to the backup control unit, so that the processing of the resource object is quickly recovered to ensure that the service is not interrupted.

Figure 7:
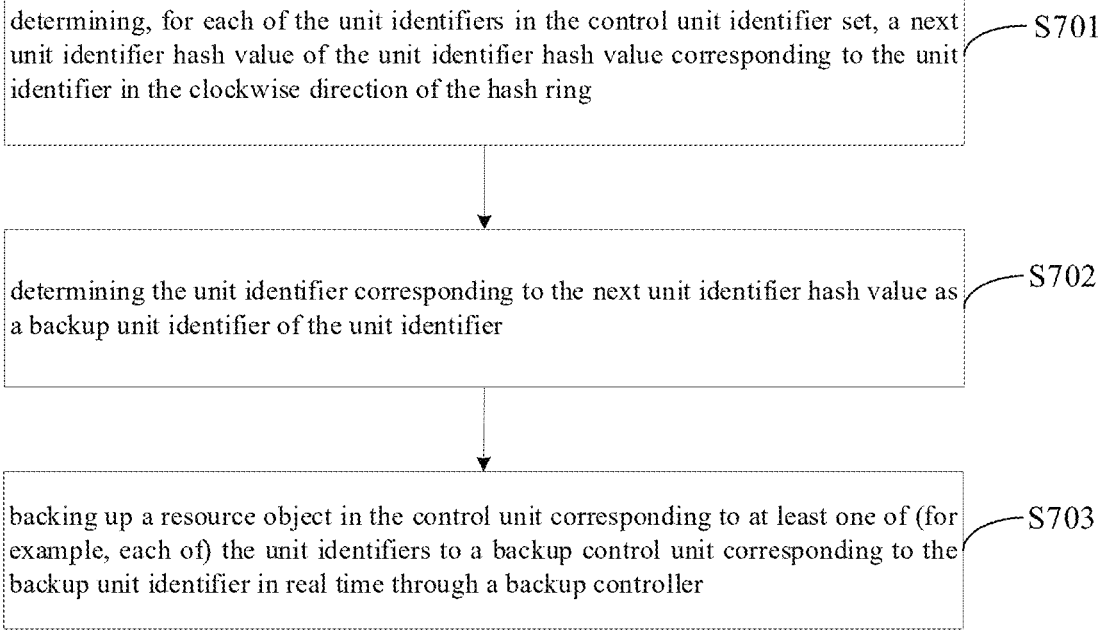
FIG. 7 is a flowchart of another resource object processing method provided by an embodiment of the present disclosure.

Optionally, as shown in FIG. 7, the method may further include:

S701, determining, for each of the unit identifiers in the control unit identifier set, a next unit identifier hash value of the unit identifier hash value corresponding to the unit identifier in the clockwise direction of the hash ring.

In some embodiments, the hash ring in the consistent hash model may just cope with the scenario where the number of the control units is reduced. In the unit mapping algorithm, the result of the consistent hash is taken as the target control unit which may be represented as TargetCellID, and the next unit identifier hash value of the unit identifier hash value corresponding to the unit identifier is determined.

S702, determining the unit identifier corresponding to the next unit identifier hash value as a backup unit identifier of the unit identifier.

Figure 8:
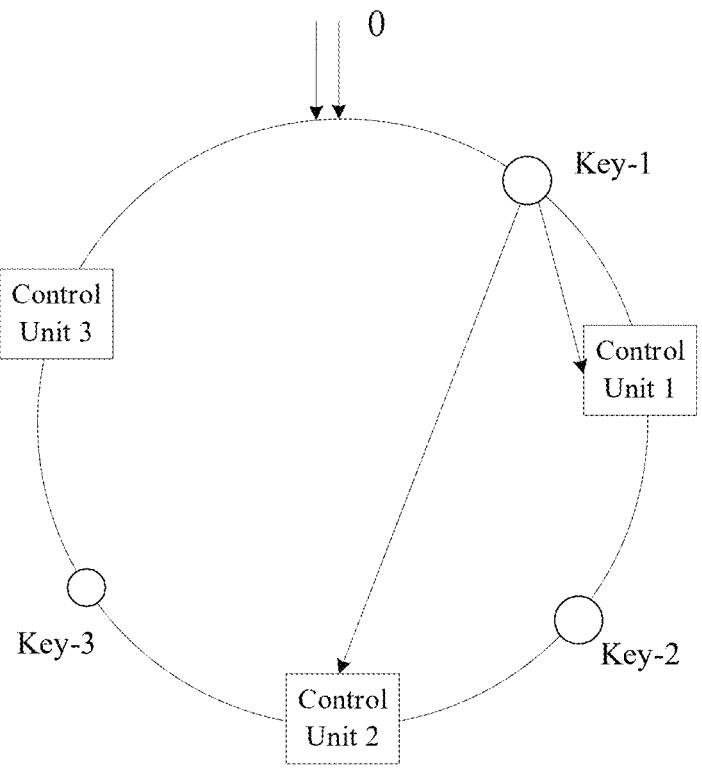
FIG. 8 is a schematic diagram of another resource object processing method provided by an embodiment of the present disclosure.

Optionally, the backup unit identifier may be represented as BackupCellID. Exemplarily, as shown in FIG. 8, in the consistent hash model, the multiple control units include a control unit 1, a control unit 2, and a control unit 3. The multiple resource objects may include Key-1, Key-2, and Key-3.

The target control unit corresponding to the resource object Key-1 is the control unit 1, and the next control unit in the clockwise direction (the control unit 2) is taken as the backup control unit. The target control unit corresponding to the resource object Key-2 is the control unit 2, and the next control unit in the clockwise direction (the control unit 3) is taken as the backup control unit. The target control unit corresponding to the resource object Key-3 is the control unit 3, and the next control unit in the clockwise direction (the control unit 1) is taken as the backup control unit.

S703, backing up a resource object in the control unit corresponding to at least one of (for example, each of) the unit identifiers to a backup control unit corresponding to the backup unit identifier in real time through a backup controller.

Figure 9:
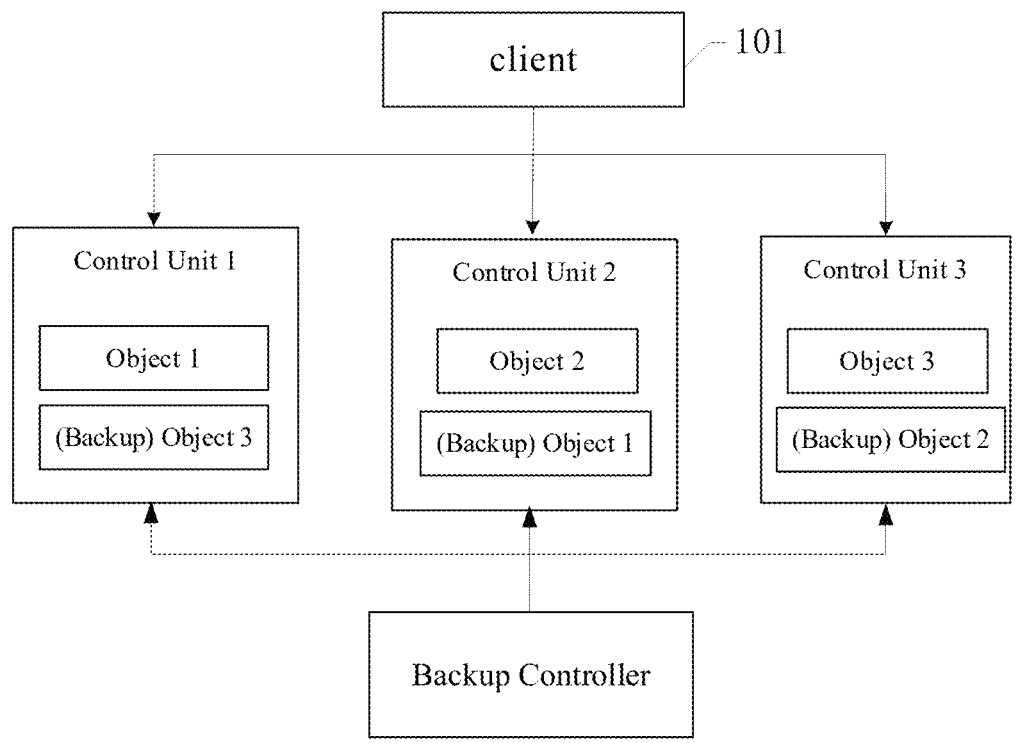
FIG. 9 is a schematic diagram of a resource backup method provided by an embodiment of the present disclosure.

Exemplarily, as shown in FIG. 9, the multiple control units include a control unit 1, a control unit 2, and a control unit 3. The objects in the control unit 1, the control unit 2, and the control unit 3 may be backed up with each other in pairs. The control unit 1 includes an object 1; the backup unit of the control unit 1 is the control unit 2, and the object 1 in the control unit 1 may be backed up to the control unit 2. The control unit 2 includes an object 2; the backup unit of the control unit 2 is the control unit 3, and the object 2 in the control unit 2 may be backed up to the control unit 3. The control unit 3 includes an object 3; the backup unit of the control unit 3 is the control unit 1, and the object 3 in the control unit 3 may be backed up to the control unit 1.

In some embodiments, the resource object processing method includes: if the target control unit is in an abnormal state, determining, according to the backup unit identifier corresponding to the unit identifier of the target control unit, a backup service address corresponding to the backup control unit from the service address set; and establishing the communication connection based on the backup service address, and performing the resource processing operation of the target object through the communication connection.

In the embodiments of the present disclosure, the backup control unit of each resource object may be determined through the backup controller, and for each resource object, the resource object is synchronized to the backup control unit of the resource object in real time through the backup controller. In this way, after the main control unit corresponding to the resource object is faulty, the configuration may be modified to switch the resource mapping to the backup control unit, so that the processing of the resource object is quickly recovered to ensure that the service is not interrupted, thereby further improving the stability of the storage system.

Figure 10:
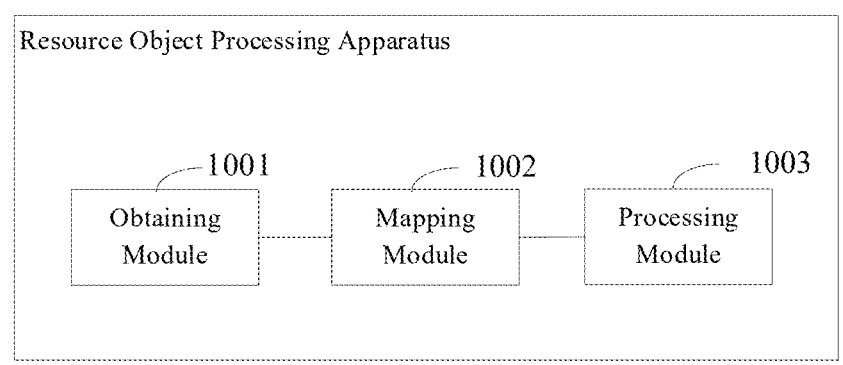
FIG. 10 is a structural block diagram of a resource object processing apparatus provided by an embodiment of the present disclosure.

FIG. 10 is a structural block diagram of a resource object processing apparatus provided by an embodiment of the present disclosure. The apparatus includes an obtaining module 1001, a mapping module 1002, and a processing module 1003.

The obtaining module 1001 is configured to obtain a control unit identifier set and a service address set of a federated storage cluster control layer, the control unit identifier set is used to maintain respective unit identifiers of multiple control units that are independent and isolated from each other and are supported in the federated storage cluster control layer, and one control unit of the multiple control units is used to control resource processing of at least one storage cluster in a federated storage cluster; the service address set is used to maintain a service address of each control unit of the multiple control units in the storage cluster control layer;

the mapping module 1002 is configured to map, according to a first object identifier of a target object to be processed, a unit identifier of a target control unit uniquely corresponding to the target object from the control unit identifier set; and the processing module 1003 is configured to determine, according to the unit identifier of the target control unit, a target service address corresponding to the target control unit from the service address set, establish a communication connection based on the target service address, and perform a resource processing operation of the target object through the communication connection.

According to one or more embodiments of the present disclosure, the apparatus further includes a scale-up and scale-down module. The scale-up and scale-down module is configured to perform, through a load balance controller in the federated storage cluster, dynamic scale-up and scale-down processing on at least one control unit of the multiple control units in the federated storage cluster control layer according to an actual load condition and a load balance requirement condition of the at least one control unit in the federated storage cluster control layer.

According to one or more embodiments of the present disclosure, by the scale-up and scale-down module, performing, through the load balance controller in the federated storage cluster, dynamic scale-up and scale-down processing on at least one control unit of the multiple control units in the federated storage cluster control layer according to the actual load condition and the load balance requirement condition of the at least one control unit in the federated storage cluster control layer specifically including: determining, through the load balance controller, an average load value of all control units in the federated storage cluster control layer; performing, through the load balance controller, scale-up processing on the federated storage cluster control layer if the average load value is greater than a first load threshold; and performing, through the load balance controller, scale-down processing on the federated storage cluster control layer if the average load value is less than a second load threshold.

According to one or more embodiments of the present disclosure, the processing module 1003 is further configured to, in a load balance process of performing the scale-up and scale-down processing, receiving a first resource request for requesting to perform processing on a first resource, map a first target control unit corresponding to the first resource according to a first control unit identifier set before the scale-up and scale-down processing, map a second target control unit corresponding to the first resource according to a second control unit identifier set after the scale-up and scale-down processing, and select, according to the first target control unit, the second target control unit, and a scale-up and scale-down classification condition of all the control units, the first target control unit or the second target control unit to control execution of the first resource request, wherein the scale-up and scale-down classification condition of the control unit comprises: a newly added control unit, a removed control unit, or a normal control unit.

According to one or more embodiments of the present disclosure, by the mapping module, mapping, according to the first object identifier of the target object to be processed, the unit identifier of the target control unit uniquely corresponding to the target object from the control unit identifier set specifically includes: determining an object identifier hash value of the first object identifier and a unit identifier hash value of each of the unit identifiers in the control unit identifier set according to the first object identifier, the control unit identifier set, and a hash algorithm model; mapping the unit identifier hash values of the nit identifiers to a hash ring according to an ascending order of the unit identifier hash values of the unit identifiers in the control unit identifier set; and finding a first target unit identifier hash value greater than the object identifier hash value in a clockwise direction of the hash ring, and determining a unit identifier corresponding to the first target unit identifier hash value as the unit identifier of the target control unit uniquely corresponding to the target object.

According to one or more embodiments of the present disclosure, the apparatus further includes a backup module. The backup module is configured to determine, for each of the unit identifiers in the control unit identifier set, a next unit identifier hash value of the unit identifier hash value of the each of the unit identifiers in the clockwise direction of the hash ring, determine a unit identifier corresponding to the next unit identifier hash value as a backup unit identifier of the unit identifier, and back up a resource object in the control unit corresponding to at least one of the unit identifiers to a backup control unit corresponding to the backup unit identifier in real time through a backup controller.

According to one or more embodiments of the present disclosure, the backup module is further configured to, if the target control unit is in an abnormal state, determine a backup service address corresponding to the backup control unit from the service address set according to the backup unit identifier corresponding to the unit identifier of the target control unit, and establish the communication connection based on the backup service address, and perform the resource processing operation of the target object through the communication connection.

According to one or more embodiments of the present disclosure, by the processing module 1003, establishing the communication connection based on the target service address, and performing the resource processing operation of the target object through the communication connection specifically including: establishing the communication connection between the target control unit and a client based on the target service address, and if the target control unit receives a processing request of the client through the communication connection, determining, through a scheduling module in the target control unit, a target storage cluster for processing the target object from at least one storage cluster connected thereto;
  if the processing request is a storage request, storing the target object on the target storage cluster through a control module in the target control unit;
  if the processing request is an access request, accessing the target object from the target storage cluster through the control module in the target control unit;
  if the processing request is an update request, updating the target object on the target storage cluster through the control module in the target control unit; and
  if the processing request is a deletion request, deleting the target object from the target storage cluster through the control module in the target control unit.

Figure 11:
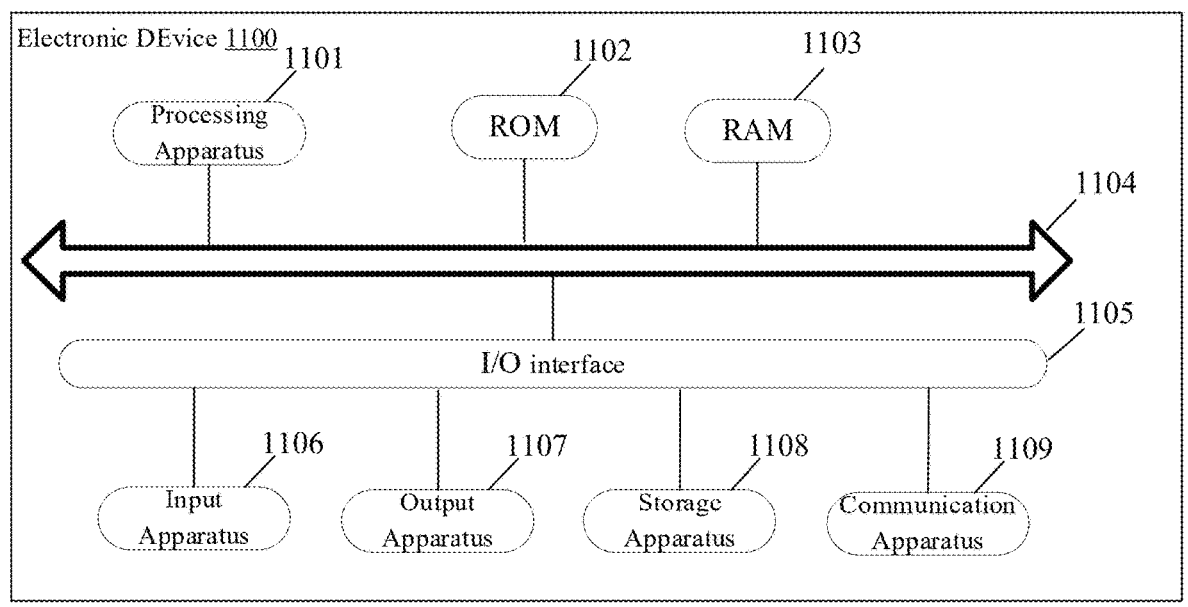
FIG. 11 is a schematic diagram of a hardware structure of an electronic device provided by an embodiment of the present disclosure.

Referring to FIG. 11, it shows a schematic structural diagram of an electronic device 1100 suitable for implementing the embodiments of the present disclosure. The electronic device 1100 may be a terminal device or a server. The terminal device may include, but is not limited to, mobile terminals such as a mobile phone, a notebook computer, a digital broadcast receiver, a personal digital assistant (abbreviated as PDA), a tablet computer, a portable media player (abbreviated as PMP), an in-vehicle terminal (for example, an in-vehicle navigation terminal), etc., and fixed terminals such as a digital TV, a desktop computer, etc. The electronic device shown in FIG. 11 is only an example, and should not bring any limitation to the functions and application scope of the embodiments of the present disclosure.

As shown in FIG. 11, the electronic device 1100 may include a processing apparatus (for example, a central processing unit, a graphics processing unit, etc.) 1101, which may perform various appropriate actions and processes according to a program stored in a read-only memory (abbreviated as ROM) 1102 or a program loaded from a storage apparatus 1108 into a random access memory (abbreviated as RAM) 1103. In the RAM 1103, various programs and data required for the operation of the electronic device 1100 are also stored. The processing apparatus 1101, the ROM 1102, and the RAM 1103 are connected to each other through a bus 1104. An input/output (I/O) interface 1105 is also connected to the bus 1104.

Generally, the following apparatuses may be connected to the I/O interface 1105: an input apparatus 1106 including, for example, a touchscreen, a touchpad, a keyboard, a mouse, a camera, a microphone, an accelerometer, a gyroscope, etc.; an output apparatus 1107 including, for example, a liquid crystal display (abbreviated as LCD), a speaker, a vibrator, etc.; a storage apparatus 1108 including, for example, a magnetic tape, a hard disk, etc.; and a communication apparatus 1109. The communication apparatus 1109 may allow the electronic device 1100 to perform wireless or wired communication with other devices to exchange data. Although FIG. 11 shows the electronic device 1100 with various apparatuses, it should be understood that it is not required to implement or have all the shown apparatuses. It may be an alternative to implement or have more or fewer apparatuses.

In particular, according to an embodiment of the present disclosure, the process described above with reference to the flowchart may be implemented as a computer software program. For example, an embodiment of the present disclosure includes a computer program product, which includes a computer program carried on a computer-readable medium, and the computer program includes program code for performing the method shown in the flowchart. In such an embodiment, the computer program may be downloaded and installed from the network through the communication apparatus 1109, or installed from the storage apparatus 1108, or installed from the ROM 1102. When the computer program is executed by the processing apparatus 1101, the above-mentioned functions defined in the method of the embodiments of the present disclosure are performed.

It should be noted that the above computer-readable medium in the present disclosure may be a computer-readable signal medium or a computer-readable storage medium, or any combination of the above two. The computer-readable storage medium may be, for example, but not limited to, an electronic, magnetic, optical, electromagnetic, infrared, or semiconductor system, apparatus, or device, or any combination of the above. More specific examples of the computer-readable storage medium may include, but are not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium may be any tangible medium that contains or stores a program, and the program may be used by or in combination with an instruction execution system, apparatus, or device. In the present disclosure, the computer-readable signal medium may include a data signal propagated in a baseband or as part of a carrier, and computer-readable program code is carried in the data signal. The propagated data signal may take many forms, including but not limited to an electromagnetic signal, an optical signal, or any suitable combination of the above. The computer-readable signal medium may also be any computer-readable medium other than a computer-readable storage medium. The computer-readable signal medium may send, propagate, or transmit a program used by or in combination with an instruction execution system, apparatus, or device. The program code contained on the computer-readable medium may be transmitted by any suitable medium, including but not limited to: a wire, an optical cable, RF (radio frequency), etc., or any suitable combination of the above.

The above computer-readable medium may be included in the above electronic device, or may exist alone without being assembled into the electronic device.

The above computer-readable medium carries one or more programs, and when the one or more programs are executed by the electronic device, the electronic device is caused to execute the method shown in the above embodiments.

The computer program code for performing the operations of the present disclosure may be written in one or more programming languages or a combination thereof. The programming languages include object-oriented programming languages such as Java, Smalltalk, C++, and also include conventional procedural programming languages such as the "C" language or similar programming languages. The program code may be executed entirely on a user's computer, partly on the user's computer, as a stand-alone software package, partly on the user's computer and partly on a remote computer, or entirely on the remote computer or on a server. In the case of the remote computer, the remote computer may be connected to the user's computer through any kind of network, including a local area network (abbreviated as LAN) or a wide area network (abbreviated as WAN), or may be connected to an external computer (for example, via the Internet provided by an Internet service provider).

The flowcharts and block diagrams in the drawings illustrate the architecture, functions, and operations of possible implementations of systems, methods, and computer program products according to various embodiments of the present disclosure. In this regard, each block in the flowcharts or block diagrams may represent a module, a program segment, or a part of code. The module, program segment, or part of code includes one or more executable instructions for implementing specified logical functions. It should also be noted that, in some alternative implementations, the functions marked in the blocks may also occur in an order different from the order marked in the drawings. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, may be implemented by a dedicated hardware-based system that performs specified functions or operations, or may be implemented by a combination of dedicated hardware and computer instructions.

The units involved in the embodiments of the present disclosure may be implemented in software or hardware. Wherein, the name of the unit does not constitute a limitation of the unit itself under certain circumstances. For example, a first obtaining unit may also be described as "a unit for obtaining at least two Internet protocol addresses".

The functions described herein above may be performed, at least partially, by one or more hardware logic components. For example, without limitation, exemplary types of hardware logic components that can be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine-readable medium may be a tangible medium that may contain or store a program for use by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium may include an electrical connection based on one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

In a first aspect, according to one or more embodiments of the present disclosure, the method includes:
  obtaining a control unit identifier set and a service address set of a federated storage cluster control layer, wherein the control unit identifier set is used to maintain respective unit identifiers of multiple control units that are independent and isolated from each other and are supported in the federated storage cluster control layer, and one control unit of the multiple control units is used to control resource processing of at least one storage cluster in a federated storage cluster; the service address set is used to maintain a service address of each control unit of the multiple control units in the storage cluster control layer;

mapping, according to a first object identifier of a target object to be processed, a unit identifier of a target control unit uniquely corresponding to the target object from the control unit identifier set; and determining, according to the unit identifier of the target control unit, a target service address corresponding to the target control unit from the service address set, establishing a communication connection based on the target service address, and performing a resource processing operation of the target object through the communication connection.

According to one or more embodiments of the present disclosure, the method further includes: performing, through a load balance controller in the federated storage cluster, dynamic scale-up and scale-down processing on the control unit in the federated storage cluster control layer according to an actual load condition and a load balance requirement condition of the control unit in the federated storage cluster control layer.

According to one or more embodiments of the present disclosure, performing, through the load balance controller in the federated storage cluster, the dynamic scale-up and scale-down processing on at least one control unit of the multiple control units in the federated storage cluster control layer according to the actual load condition and the load balance requirement condition of the at least one control unit in the federated storage cluster control layer includes: determining, through the load balance controller, an average load value of all the control units in the federated storage cluster control layer; performing, through the load balance controller, scale-up processing on the federated storage cluster control layer if the average load value is greater than a first load threshold; and performing, through the load balance controller, scale-down processing on the federated storage cluster control layer if the average load value is less than a second load threshold.

According to one or more embodiments of the present disclosure, the method further includes: in a load balance process of performing scale-up and scale-down processing, receiving a first resource request for requesting to perform processing on a first resource, mapping a first target control unit corresponding to the first resource according to a first control unit identifier set before the scale-up and scale-down processing, and mapping a second target control unit corresponding to the first resource according to a second control unit identifier set after the scale-up and scale-down processing; and selecting, according to the first target control unit, the second target control unit, and a scale-up and scale-down classification condition of all the control units, the first target control unit or the second target control unit to control execution of the first resource request, wherein the scale-up and scale-down classification condition of the control unit comprises: a newly added control unit, a removed control unit, or a normal control unit.

According to one or more embodiments of the present disclosure, the mapping, according to the first object identifier of the target object to be processed, the unit identifier of the target control unit uniquely corresponding to the target object from the control unit identifier set includes: determining an object identifier hash value of the first object identifier and a unit identifier hash value of each of the unit identifiers in the control unit identifier set according to the first object identifier, the control unit identifier set, and a hash algorithm model; mapping the unit identifier hash values of the unit identifiers to a hash ring according to an ascending order of the unit identifier hash values of the unit identifiers in the control unit identifier set; and finding a first target unit identifier hash value greater than the object identifier hash value in a clockwise direction of the hash ring, and determining a unit identifier corresponding to the first target unit identifier hash value as the unit identifier of the target control unit uniquely corresponding to the target object.

According to one or more embodiments of the present disclosure, the method further includes: determining, for each of the unit identifiers in the control unit identifier set, a next unit identifier hash value of the unit identifier hash value of the each of the unit identifiers in the clockwise direction of the hash ring; determining a unit identifier corresponding to the next unit identifier hash value as a backup unit identifier of the unit identifier; and backing up a resource object in the control unit corresponding to at least one of the unit identifiers to a backup control unit corresponding to the backup unit identifier in real time through a backup controller.

According to one or more embodiments of the present disclosure, after mapping, according to the first object identifier of the target object to be processed, the unit identifier of the target control unit uniquely corresponding to the target object from the control unit identifier set, the method further includes: if the target control unit is in an abnormal state, determining a backup service address corresponding to the backup control unit from the service address set according to the backup unit identifier corresponding to the unit identifier of the target control unit; and establishing the communication connection based on the backup service address, and performing the resource processing operation of the target object through the communication connection.

According to one or more embodiments of the present disclosure, the establishing the communication connection based on the target service address, and performing the resource processing operation of the target object through the communication connection includes: establishing the communication connection between the target control unit and a client based on the target service address, and if the target control unit receives a processing request of the client through the communication connection, determining, through a scheduling module in the target control unit, a target storage cluster for processing the target object from at least one storage cluster connected thereto;

if the processing request is a storage request, storing the target object on the target storage cluster through a control module in the target control unit;

if the processing request is an access request, accessing the target object from the target storage cluster through the control module in the target control unit;

if the processing request is an update request, updating the target object on the target storage cluster through the control module in the target control unit; and if the processing request is a deletion request, deleting the target object from the target storage cluster through the control module in the target control unit.

In a second aspect, according to one or more embodiments of the present disclosure, the apparatus includes:

an obtaining module configured to obtain a control unit identifier set and a service address set of a federated storage cluster control layer, the control unit identifier set is used to maintain respective unit identifiers of multiple control units that are independent and isolated from each other and are supported in the federated storage cluster control layer, and one control unit of the multiple control units is used to control resource processing of at least one storage cluster in a federated storage cluster; the service address set is used to maintain a service address of each control unit of the multiple control units in the storage cluster control layer;

a mapping module configured to map, according to a first object identifier of a target object to be processed, a unit identifier of a target control unit uniquely corresponding to the target object from the control unit identifier set; and a processing module configured to determine, according to the unit identifier of the target control unit, a target service address corresponding to the target control unit from the service address set, establish a communication connection based on the target service address, and perform a resource processing operation of the target object through the communication connection.

According to one or more embodiments of the present disclosure, the apparatus further includes a scale-up and scale-down module, the scale-up and scale-down module is configured to perform, through a load balance controller in the federated storage cluster, dynamic scale-up and scale-down processing on at least one control unit of the multiple control units in the federated storage cluster control layer according to an actual load condition and a load balance requirement condition of the at least one control unit in the federated storage cluster control layer.

According to one or more embodiments of the present disclosure, by the scale-up and scale-down module, performing, through the load balance controller in the federated storage cluster, dynamic scale-up and scale-down processing on at least one control unit of the multiple control units in the federated storage cluster control layer according to the actual load condition and the load balance requirement condition of the at least one control unit in the federated storage cluster control layer specifically including: determining, through the load balance controller, an average load value of all control units in the federated storage cluster control layer; performing, through the load balance controller, scale-up processing on the federated storage cluster control layer if the average load value is greater than a first load threshold; and performing, through the load balance controller, scale-down processing on the federated storage cluster control layer if the average load value is less than a second load threshold.

According to one or more embodiments of the present disclosure, the processing module is further configured to, in a load balance process of performing the scale-up and scale-down processing, receiving a first resource request for requesting to perform processing on a first resource, map a first target control unit corresponding to the first resource according to a first control unit identifier set before the scale-up and scale-down processing, map a second target control unit corresponding to the first resource according to a second control unit identifier set after the scale-up and scale-down processing, and select, according to the first target control unit, the second target control unit, and a scale-up and scale-down classification condition of all the control units, the first target control unit or the second target control unit to control execution of the first resource request, wherein the scale-up and scale-down classification condition of the control unit comprises: a newly added control unit, a removed control unit, or a normal control unit.

According to one or more embodiments of the present disclosure, by the mapping module, mapping, according to the first object identifier of the target object to be processed, the unit identifier of the target control unit uniquely corresponding to the target object from the control unit identifier set specifically includes: determining an object identifier hash value of the first object identifier and a unit identifier hash value of each of the unit identifiers in the control unit identifier set according to the first object identifier, the control unit identifier set, and a hash algorithm model; mapping the unit identifier hash values of the nit identifiers to a hash ring according to an ascending order of the unit identifier hash values of the unit identifiers in the control unit identifier set; and finding a first target unit identifier hash value greater than the object identifier hash value in a clockwise direction of the hash ring, and determining a unit identifier corresponding to the first target unit identifier hash value as the unit identifier of the target control unit uniquely corresponding to the target object.

According to one or more embodiments of the present disclosure, the apparatus further includes a backup module. The backup module is configured to determine, for each of the unit identifiers in the control unit identifier set, a next unit identifier hash value of the unit identifier hash value of the each of the unit identifiers in the clockwise direction of the hash ring, determine a unit identifier corresponding to the next unit identifier hash value as a backup unit identifier of the unit identifier, and back up a resource object in the control unit corresponding to at least one of the unit identifiers to a backup control unit corresponding to the backup unit identifier in real time through a backup controller.

According to one or more embodiments of the present disclosure, the backup module is further configured to: if the target control unit is in an abnormal state, determine the backup service address corresponding to the backup control unit from the service address set according to the backup unit identifier corresponding to the unit identifier of the target control unit; and establish the communication connection based on the backup service address, and perform the resource processing operation of the target object through the communication connection.

According to one or more embodiments of the present disclosure, by the processing module, establishing the communication connection based on the target service address, and performing the resource processing operation of the target object through the communication connection specifically including: establishing the communication connection between the target control unit and a client based on the target service address, and if the target control unit receives a processing request of the client through the communication connection, determining, through a scheduling module in the target control unit, a target storage cluster for processing the target object from at least one storage cluster connected thereto; if the processing request is a storage request, storing the target object on the target storage cluster through a control module in the target control unit; if the processing request is an access request, accessing the target object from the target storage cluster through the control module in the target control unit; if the processing request is an update request, updating the target object on the target storage cluster through the control module in the target control unit; and if the processing request is a deletion request, deleting the target object from the target storage cluster through the control module in the target control unit.

In a third aspect, according to one or more embodiments of the present disclosure, an electronic device is provided, which includes a processor and a memory communicatively connected to the processor.

The memory stores computer execution instructions.

The processor executes the computer execution instructions stored in the memory to implement the resource object processing method according to the above first aspect and various possible designs of the first aspect.

In a fourth aspect, according to one or more embodiments of the present disclosure, a computer-readable storage medium is provided. The computer-readable storage medium stores computer execution instructions, and upon a processor executing the computer execution instructions, the resource object processing method according to the above first aspect and various possible designs of the first aspect is implemented.

In a fifth aspect, an embodiment of the present disclosure provides a computer program product, including a computer program. Upon the computer program being executed by a processor, the resource object processing method according to the above first aspect and various possible designs of the first aspect is implemented.

The above description is only the preferred embodiments of the present disclosure and the description of the applied technical principles. Those skilled in the art should understand that the scope of disclosure involved in the present disclosure is not limited to the technical solutions formed by the specific combination of the above-mentioned technical features, but also covers other technical solutions formed by the arbitrary combination of the above-mentioned technical features or their equivalent features without departing from the above-mentioned disclosed concept. For example, a technical solution formed by replacing the above features with the technical features having similar functions disclosed in the present disclosure (but not limited to).

In addition, although the operations are described in a specific order, this should not be understood as requiring these operations to be performed in the specific order shown or in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments separately or in any suitable sub-combination.

Although this subject matter has been described in language specific to structural features and/or logical actions of the method, it should be understood that the subject matter defined in the appended claims is not necessarily limited to the specific features or actions described above. On the contrary, the specific features and actions described above are only example forms for implementing the claims.

The invention claimed is:

1. A resource object processing method, comprising:
obtaining a control unit identifier set and a service address set of a federated storage cluster control layer, wherein the control unit identifier set is used to maintain respective unit identifiers of multiple control units that are independent and isolated from each other and are supported in the federated storage cluster control layer, and one control unit of the multiple control units is used to control resource processing of at least one storage cluster in a federated storage cluster; the service address set is used to maintain a service address of each control unit of the multiple control units in the storage cluster control layer;
mapping, according to a first object identifier of a target object to be processed, a unit identifier of a target control unit uniquely corresponding to the target object from the control unit identifier set; and
determining, according to the unit identifier of the target control unit, a target service address corresponding to the target control unit from the service address set, establishing a communication connection based on the target service address, and performing a resource processing operation of the target object through the communication connection.

2. The method according to claim 1, further comprising:
performing, through a load balance controller in the federated storage cluster, dynamic scale-up and scale-down processing on at least one control unit of the multiple control units in the federated storage cluster control layer according to an actual load condition and a load balance requirement condition of the at least one control unit in the federated storage cluster control layer.

3. The method according to claim 2, wherein performing, through the load balance controller in the federated storage cluster, the dynamic scale-up and scale-down processing on at least one control unit of the multiple control units in the federated storage cluster control layer according to the actual load condition and the load balance requirement condition of the at least one control unit in the federated storage cluster control layer comprises:
determining, through the load balance controller, an average load value of all the control units in the federated storage cluster control layer;
performing, through the load balance controller, scale-up processing on the federated storage cluster control layer if the average load value is greater than a first load threshold; and
performing, through the load balance controller, scale-down processing on the federated storage cluster control layer if the average load value is less than a second load threshold.

4. The method according to claim 3, further comprising:
in a load balance process of performing the scale-up and scale-down processing, receiving a first resource request for requesting to perform processing on a first resource, mapping a first target control unit corresponding to the first resource according to a first control unit identifier set before the scale-up and scale-down processing, and mapping a second target control unit corresponding to the first resource according to a second control unit identifier set after the scale-up and scale-down processing; and
selecting, according to the first target control unit, the second target control unit, and a scale-up and scale-down classification condition of all the control units, the first target control unit or the second target control unit to control execution of the first resource request, wherein the scale-up and scale-down classification condition of the control unit comprises: a newly added control unit, a removed control unit, or a normal control unit.

5. The method according to claim 4, wherein before the load balance of performing the scale-up and scale-down processing is completed, the multiple control units that are independent and isolated from each other comprise a removed control unit and a normal control unit; and after the load balance of performing the scale-up and scale-down processing is completed, the multiple control units that are independent and isolated from each other comprise a newly added control unit and the normal control unit.

6. The method according to claim 4, further comprising: determining whether to migrate the first resource according to a scale-up and scale-down classification condition of the first target control unit, the second target control unit, and all the control units.

7. The method according to claim 6, wherein if the first target control unit is a removed control unit and the second target control unit is a normal control unit, the first resource is migrated;

if the first target control unit is the normal control unit and the second target control unit is a newly added control unit, the first resource is migrated;

if the first target control unit is the normal control unit and the second target control unit is the newly added control unit, the first resource is not migrated; and if the first target control unit is the normal control unit and the second target control unit is also the normal control unit, the first resource is not migrated.

8. The method according to claim 4, wherein establishing the communication connection based on the target service address, and performing the resource processing operation of the target object through the communication connection comprises:

establishing the communication connection between the target control unit and a client based on the target service address, and if the target control unit receives a processing request of the client through the communication connection, determining, through a scheduling module in the target control unit, a target storage cluster for processing the target object from the at least one storage cluster connected thereto;

if the processing request is a storage request, storing the target object on the target storage cluster through a control module in the target control unit;

if the processing request is an access request, accessing the target object from the target storage cluster through the control module in the target control unit;

if the processing request is an update request, updating the target object on the target storage cluster through the control module in the target control unit; and if the processing request is a deletion request, deleting the target object from the target storage cluster through the control module in the target control unit.

9. The method according to claim 3, wherein establishing the communication connection based on the target service address, and performing the resource processing operation of the target object through the communication connection comprises:

establishing the communication connection between the target control unit and a client based on the target service address, and if the target control unit receives a processing request of the client through the communication connection, determining, through a scheduling module in the target control unit, a target storage cluster for processing the target object from the at least one storage cluster connected thereto;

if the processing request is a storage request, storing the target object on the target storage cluster through a control module in the target control unit;

if the processing request is an access request, accessing the target object from the target storage cluster through the control module in the target control unit;

if the processing request is an update request, updating the target object on the target storage cluster through the control module in the target control unit; and if the processing request is a deletion request, deleting the target object from the target storage cluster through the control module in the target control unit.

10. The method according to claim 2, wherein a total number of the multiple control units is adjusted according to a load pressure, when a total number of the resource object increases and reaches an upper limit of a load capacity of at least one of the multiple control units, more of the control units are expanded, and when the total number of the resource object decreases and each of the multiple control units is under a relatively low load pressure, some of the control units are removed.

11. The method according to claim 2, further comprising:

for each second resource object that has been stored, obtaining a second object identifier of the second resource object, a first control unit where the second resource object is currently located, and multiple unit identifiers of the multiple control units after adjustment of a total number of the multiple control units;

determining a second control unit for processing the second resource object according to the second object identifier of the second resource object, the multiple unit identifiers of the multiple control units after the adjustment of the number of the multiple control units, and a preset algorithm model; and if the first control unit is different from the second control unit, deleting the second resource object through the first control unit, and storing the second resource object through the second control unit.

12. The method according to claim 2, wherein establishing the communication connection based on the target service address, and performing the resource processing operation of the target object through the communication connection comprises:

establishing the communication connection between the target control unit and a client based on the target service address, and if the target control unit receives a processing request of the client through the communication connection, determining, through a scheduling module in the target control unit, a target storage cluster for processing the target object from the at least one storage cluster connected thereto;

if the processing request is a storage request, storing the target object on the target storage cluster through a control module in the target control unit;

if the processing request is an access request, accessing the target object from the target storage cluster through the control module in the target control unit;

if the processing request is an update request, updating the target object on the target storage cluster through the control module in the target control unit; and if the processing request is a deletion request, deleting the target object from the target storage cluster through the control module in the target control unit.

13. The method according to claim 1, wherein the control unit identifier set comprises multiple unit identifiers;

mapping, according to the first object identifier of the target object to be processed, the unit identifier of the target control unit uniquely corresponding to the target object from the control unit identifier set comprises:

determining an object identifier hash value of the first object identifier and a unit identifier hash value of each of the unit identifiers in the control unit identifier set according to the first object identifier, the control unit identifier set, and a hash algorithm model;

mapping the unit identifier hash values of the unit identifiers to a hash ring according to an ascending order of the unit identifier hash values of the unit identifiers in the control unit identifier set; and finding a first target unit identifier hash value greater than the object identifier hash value in a clockwise direction of the hash ring, and determining a unit identifier corresponding to the first target unit identifier hash value as the unit identifier of the target control unit uniquely corresponding to the target object.

14. The method according to claim 13, further comprising:

determining, for each of the unit identifiers in the control unit identifier set, a next unit identifier hash value of the unit identifier hash value of the each of the unit identifiers in the clockwise direction of the hash ring;

determining a unit identifier corresponding to the next unit identifier hash value as a backup unit identifier of the unit identifier; and backing up a resource object in the control unit corresponding to at least one of the unit identifiers to a backup control unit corresponding to the backup unit identifier in real time through a backup controller.

15. The method according to claim 14, wherein after mapping, according to the first object identifier of the target object to be processed, the unit identifier of the target control unit uniquely corresponding to the target object from the control unit identifier set, the method further comprises:

if the target control unit is in an abnormal state, determining a backup service address corresponding to the backup control unit from the service address set according to the backup unit identifier of the unit identifier of the target control unit; and establishing the communication connection based on the backup service address, and performing the resource processing operation of the target object through the communication connection.

16. The method according to claim 14, wherein establishing the communication connection based on the target service address, and performing the resource processing operation of the target object through the communication connection comprises:

establishing the communication connection between the target control unit and a client based on the target service address, and if the target control unit receives a processing request of the client through the communication connection, determining, through a scheduling module in the target control unit, a target storage cluster for processing the target object from the at least one storage cluster connected thereto;

if the processing request is a storage request, storing the target object on the target storage cluster through a control module in the target control unit;

if the processing request is an access request, accessing the target object from the target storage cluster through the control module in the target control unit;

if the processing request is an update request, updating the target object on the target storage cluster through the control module in the target control unit; and if the processing request is a deletion request, deleting the target object from the target storage cluster through the control module in the target control unit.

17. The method according to claim 13, wherein establishing the communication connection based on the target service address, and performing the resource processing operation of the target object through the communication connection comprises:

establishing the communication connection between the target control unit and a client based on the target service address, and if the target control unit receives a processing request of the client through the communication connection, determining, through a scheduling module in the target control unit, a target storage cluster for processing the target object from the at least one storage cluster connected thereto;

if the processing request is a storage request, storing the target object on the target storage cluster through a control module in the target control unit;

if the processing request is an access request, accessing the target object from the target storage cluster through the control module in the target control unit;

if the processing request is an update request, updating the target object on the target storage cluster through the control module in the target control unit; and if the processing request is a deletion request, deleting the target object from the target storage cluster through the control module in the target control unit.

18. The method according to claim 1, wherein establishing the communication connection based on the target service address, and performing the resource processing operation of the target object through the communication connection comprises:

establishing the communication connection between the target control unit and a client based on the target service address, and if the target control unit receives a processing request of the client through the communication connection, determining, through a scheduling module in the target control unit, a target storage cluster for processing the target object from the at least one storage cluster connected thereto;

if the processing request is a storage request, storing the target object on the target storage cluster through a control module in the target control unit;

if the processing request is an access request, accessing the target object from the target storage cluster through the control module in the target control unit;

if the processing request is an update request, updating the target object on the target storage cluster through the control module in the target control unit; and if the processing request is a deletion request, deleting the target object from the target storage cluster through the control module in the target control unit.

19. An electronic device, comprising: a processor, and a memory communicatively connected to the processor, wherein the memory stores computer execution instructions;

the processor executes the computer execution instructions stored in the memory to implement a resource object processing method; and the resource object processing method comprises:

obtaining a control unit identifier set and a service address set of a federated storage cluster control layer, wherein the control unit identifier set is used to maintain respective unit identifiers of multiple control units that are independent and isolated from each other and are supported in the federated storage cluster control layer, and one control unit of the multiple control units is used to control resource processing of at least one storage cluster in a federated storage cluster; the service address set is used to maintain a service address of each control unit of the multiple control units in the storage cluster control layer;

mapping, according to a first object identifier of a target object to be processed, a unit identifier of a target control unit uniquely corresponding to the target object from the control unit identifier set; and determining, according to the unit identifier of the target control unit, a target service address corresponding to the target control unit from the service address set, establishing a communication connection based on the target service address, and performing a resource processing operation of the target object through the communication connection.

20. A computer-readable storage medium, wherein the computer-readable storage medium stores computer execution instructions, and upon a processor executing the computer execution instructions, a resource object processing method is implemented; and the resource object processing method comprises:

obtaining a control unit identifier set and a service address set of a federated storage cluster control layer, wherein the control unit identifier set is used to maintain respective unit identifiers of multiple control units that are independent and isolated from each other and are supported in the federated storage cluster control layer, and one control unit of the multiple control units is used to control resource processing of at least one storage cluster in a federated storage cluster; the service address set is used to maintain a service address of each control unit of the multiple control units in the storage cluster control layer;

mapping, according to a first object identifier of a target object to be processed, a unit identifier of a target control unit uniquely corresponding to the target object from the control unit identifier set; and determining, according to the unit identifier of the target control unit, a target service address corresponding to the target control unit from the service address set, establishing a communication connection based on the target service address, and performing a resource processing operation of the target object through the communication connection.

* * * * *